May 20, 1969     M. DETEMPLE     3,445,368

REFERENCE ELECTRODE

Filed Nov. 26, 1965

INVENTOR:
Manfred Detemple,
by Singer, Stern &
Carlberg, Attorneys

United States Patent Office 3,445,368
Patented May 20, 1969

3,445,368
REFERENCE ELECTRODE
Manfred Detemple, Mainz, Germany, assignor to Jenaer Glaswerk Schott & Gen., Mainz, Germany, a corporation of Germany
Filed Nov. 26, 1965, Ser. No. 509,893
Claims priority, application Germany, Dec. 11, 1964, J 27,100
Int. Cl. B01k 3/02, 3/04
U.S. Cl. 204—195                                     2 Claims

ABSTRACT OF THE DISCLOSURE

The invention relates to a reference electrode for measuring electrochemical potentials. A liquid-to-liquid junction means comprising a plurality of short wires made of precious metal and twisted or arranged parallel to each other or fused along their lines of contact and forming a plurality of capillaries, is arranged between the reference electrode electrolyte and the medium to be measured.

---

The invention relates to a reference electrode employed for electrochemical measurements which electrode in the usual way is equipped with means for bringing about a direct contact between the electrode and the solution to be measured so as to establish a liquid-liquid junction. This means consists of a small permeable rod-shaped partition or member extending through the wall of the reference electrode.

For measuring electrochemical potentials, there are always used a reversible indicator electrode and a reference electrode. The reversible indicator electrode has to have the property of responding as accurately as possible to the active ions or the equilibria to be measured. The purpose of the reference electrode is to maintain an ion conducting contact with the medium to be measured, independently of the condition or the type of the medium, and a constant half-cell potential. The connection of the two half-cells with a measuring chain by means of a suitable potential measuring instrument makes possible the measuring of changes in concentration which by a proper selection of the individual functions corresponds largely to the equation of Nernst for the kind of ions to be measured.

The reference electrode is filled with an electrolyte the cations and anions of which preferably have the same migration velocity. At one point in or at the so-called liquid-liquid junction the reference electrode electrolyte comes into contact with the medium to be measured. It is of importance in this case that the contact of ions remain uniform. As a rule this is achieved by imparting a pressure to the electrolyte which is higher than that of the medium and this results in a constant discharge of reference electrode electrolyte. This ensures a transition area which remains of a constant size. Also for single rod measuring chains a liquid-liquid junction of the aforementioned conditions is required.

By providing various modifications of the liquid-liquid junction one obtains contact points having an electrolyte discharge of differing quantities. Well known is the use of porous porcelain, magnesia or similar ceramic materials; also known is the use of sintered fine porous glass frits. In many cases also asbestos threads are used. Such liquid junction means as a rule are fixedly incorporated into the reference electrode body by fusing, welding or cementing. For liquid junction means with good contact properties also narrow single capillaries or polished members are used. For a liquid junction means desired to discharge a very small quantity of electrolyte a solid precious metal thread having a high thermal expansion is used which is fused into a glass body having a lower thermal expansion. During the cooling process the metal shrinks somewhat and thereby disconnects itself at some points from the surrounding glass boundary surface. Into the remaining very narrow spaces between the glass and the metal the electrolyte of the reference electrode diffuses and comes into contact with the medium to be measured.

It is obvious that by a large discharge of electrolyte a defined transition area of reference electrode electrolyte and measurement medium is obtained. In many cases, particularly when measurements over greater periods of time in small volumes of measurement medium are made, disturbances or falsifications of the results will occurs when the discharge of electrolyte is extensive. Also, an excessive discharge of electrolyte during continuous measurements, as they occur in the chemical industry and in sewage treatment, requires too great a supply of electrolyte.

Therefore, the most favorable ratio between electrolyte discharge and transition area has to be established. The discharge of electrolyte should not be too small an amount in order that no disturbances at the contact point between the electrolyte and the measurement medium will arise. On the other hand, the discharge of electrolyte must not be too great either, because in measurements of small volumes the indicator electrode must be able to influence the potential. For this reason, in laboratory and industrial practice reference electrodes of different electrolyte discharge rates have to be used. The extreme values are discharges of 0.5 $\mu$l per hour and 1 ml. per hour. In most cases a discharge from 20 to 50 $\mu$l per hour will meet the requirements.

Most of the above described liquid junction materials and arrangements of the same are, however, limited in their chemical durability and therewith in the required steady quality of the contact. They dissolve in strong acids and bases, particularly at high temperatures. Furthermore, these disclosed liquid junction means are not suitable to be fused, welded or cemented into every material required for a certain purpose. It is, for example, not possible to fuse porous ceramics of any kind into special glasses having a high thermal expansion, as they are used for the tubes of glass electrodes in the determination of the pH-value, and yet maintain a good permeability.

It is the object of the invention to produce a liquid-to-liquid junction means of a high chemical durability. This liquid-to-liquid junction means is to be adjustable as to its electrolyte permeability and is to maintain a good constant permeability also over a longer period of time and when used in aggressive media. It is to be fusible into glasses having a high as well as a low thermal expansion without imparing its electrolyte permeability by the normal manufacture procedures. The liquid-liquid junction means should also be capable of being welded or cemented into bodies of various compositions and thermal expansions.

The liquid-liquid junction means according to the present invention fulfills all of the aforementioned requirements.

The liquid-liquid junction means to be inserted into the reference electrode for electrochemical potential measurements is made of a precious metal and is provided with fine channels.

According to the invention, the liquid-liquid junction is made of at least two twisted precious metal wires or of at least three parallel round wires which are fused together merely at the contact points.

Finally, it is also possible according to the invention to manufacture the liquid-liquid junction from a sintered precious metal.

The liquid-liquid junction may be fused, welded, pressed or cemented into the wall of the reference electrode. By selecting suitable metals or alloys the fusability into glasses of different thermal expansions is obtained. Platinum metals and their alloys have proven to be particularly suitable for this purpose. The permeability may be varied, for example, by the degree of firmness of the twisting of the individual wires. A careful fusing together of the surfaces of a plurality of thin twisted precious metal wires may help to maintain the stability of the wires and in this condition the wires may be conveniently fused, welded or cemented into suitable glasses or plastics.

The invention will be described in further detail with reference to the accompanying drawing, in which.

Figure 1:
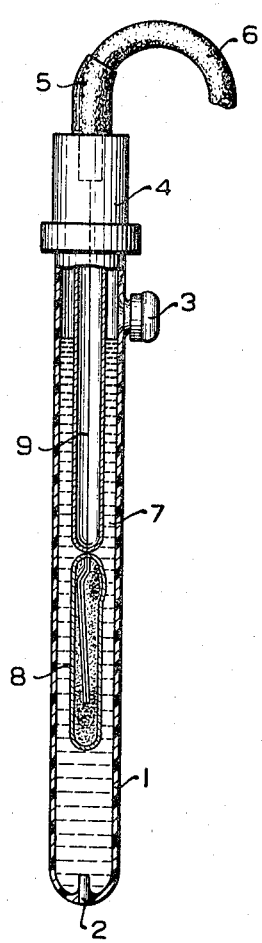
FIG. 1 illustrates a reference electrode in a side elevation view, partly in section.

Referring to FIG. 1, the outer tube 1 of the reference electrode made of a glass or a plastic having suitable chemical properties has fused, welded, pressed or cemented thereto a liquid-liquid junction means 2. The liquid-liquid junction means 2 in the illustrated embodiment comprises an opening and a plurality of precious metal wires, at least three, arranged closely one next to the other in said opening and extending substantially perpendicularly to the plane of said opening.

The remaining parts of the reference electrode are the usual ones. The outer tube 1 has arranged in its wall a closure plug 3 for refilling the reference electrode with electrolyte. With 4 is designated an electrode cap closing the upper end of the tube 1, while a cable sleeve 5 extends from the center of the cap 4 and is provided for surrounding a portion of the connecting cable 6. The outer tube 1 is filled with the electrolyte 7. The other part of the reference system 8 is of known construction and is connected with the discharge wire 9.

Figure 2:
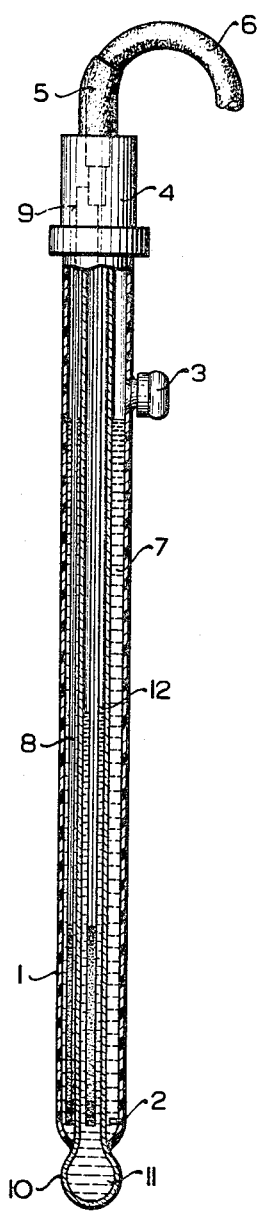
FIG. 2 is a side elevation view of one rod measuring chain, partly in section.

FIG. 2 illustrates a one rod measuring chain which is provided with a pH sensitive glass bulb 10. The buffer solution in the bulb 10 is designated with 11 and the glass electrode discharge system is designated with 12. Also in this structure the liquid-liquid junction 2 extends through the wall of the outer tube 1.

Figure 3:
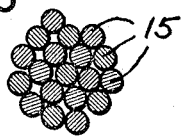
FIG. 3 illustrates in cross section a liquid-liquid junction means composed of a number of parallel disposed wires fused to each other merely at their points of contact.

FIG. 3 illustrates in cross section a liquid-liquid junction means composed of a plurality of parallel arranged round wires 15 fused to each other solely at their contact lines.

What I claim is:

1. In a reference electrode employed for electrochemical potential measurements, means for providing a liquid-to-liquid junction between the reference electrode electrolyte and the medium to be measured, said means comprising an opening and a plurality of precious metal wires arranged closely one next to the other in said opening and extending substantially perpendicularly to the plane of said opening.

2. A reference electrode according to claim 1, in which said liquid-to-liquid junction means comprises at least three round wires arranged parallel to one another and fused together solely along their surfaces of contact.

References Cited

UNITED STATES PATENTS

| | | | |
|---|---|---|---|
| 1,474,151 | 11/1923 | Keeler | 204—195 |
| 3,065,151 | 11/1962 | Schaschl et al. | 204—195 |
| 3,222,265 | 12/1965 | Beer | 204—295 |
| 3,236,759 | 2/1966 | Robinson | 204—195 |
| 3,272,731 | 9/1966 | Hutchison et al. | 204—195 |
| 3,296,098 | 1/1967 | Arthur | 204—195.1 |

OTHER REFERENCES

Ives et al., "Reference Electrodes," 1961, pp. 582–583.

JOHN H. MACK, *Primary Examiner.*

T. TUNG, *Assistant Examiner.*

U.S. Cl. X.R.

204—279